US 12,411,081 B2

United States Patent
Huelson et al.

(10) Patent No.: US 12,411,081 B2
(45) Date of Patent: Sep. 9, 2025

(54) COMBUSTION-ZONE CHEMICAL SENSING SYSTEM AND ASSOCIATED METHOD

(71) Applicant: MG Smart Ventures, LLC, Dover, DE (US)

(72) Inventors: Eric Christopher Huelson, Golden, CO (US); Bernard P. Masterson, Louisville, CO (US); Torrey Hayden, Arvada, CO (US)

(73) Assignee: MG SMART VENTURES, LLC, Dover, DE (US)

( * ) Notice: Subject to any disclaimer, the term of this patent is extended or adjusted under 35 U.S.C. 154(b) by 162 days.

(21) Appl. No.: 18/022,526

(22) PCT Filed: Sep. 16, 2021

(86) PCT No.: PCT/IB2021/058469
§ 371 (c)(1),
(2) Date: Feb. 22, 2023

(87) PCT Pub. No.: WO2022/074488
PCT Pub. Date: Apr. 14, 2022

(65) Prior Publication Data
US 2023/0314312 A1 Oct. 5, 2023

Related U.S. Application Data

(60) Provisional application No. 63/089,555, filed on Oct. 9, 2020.

(51) Int. Cl.
*G01N 21/3504* (2014.01)
(52) U.S. Cl.
CPC .......... *G01N 21/3504* (2013.01); *G01N 2201/06113* (2013.01); *G01N 2201/0636* (2013.01); *G01N 2201/08* (2013.01)

(58) Field of Classification Search
CPC ..... G01N 21/3504; G01N 2201/06113; G01N 2201/0636; G01N 2201/08; G01N 21/359;
(Continued)

(56) References Cited

U.S. PATENT DOCUMENTS 7,248,755 B2 7/2007 Sappey et al.
2003/0098412 A1 5/2003 Gentala
(Continued)

FOREIGN PATENT DOCUMENTS

JP 2750609 B2 5/1998
WO 2005103781 A1 11/2005
(Continued)

OTHER PUBLICATIONS

International Preliminary Report on Patentability received for PCT Application No. PCT/IB2021/058469, mailed on Apr. 20, 2023, 11 pages.
(Continued)

*Primary Examiner* — Kiho Kim
(74) *Attorney, Agent, or Firm* — Perilla Knox & Hildebrandt LLP; Kenneth A. Knox

(57) ABSTRACT

A combustion-zone chemical sensing system (100) is disclosed that includes pitch reflective optics (110) that collimate MIR electromagnetic energy from an input fiber (150), a reflector (120), catch reflective optics (112) that focus reflected MIR electromagnetic energy into an output fiber (152), and a detector (140) to detect MIR electromagnetic energy from the output fiber. An optical head (102) for sensing a combustion zone (104) is disclosed that includes pitch reflective optics (110) that collimate MIR electromagnetic energy from an input fiber (150) towards a reflector (120), catch reflective optics (112) that focus MIR electromagnetic energy, reflected from the reflector, into an output
(Continued)

fiber (152), and an alignment housing that interfaces with structure adjacent the combustion zone. A method for determining gas concentration within a combustion zone is disclosed that includes collimating MIR electromagnetic energy exiting from an input fiber to traverse a combustion zone and focusing reflected MIR electromagnetic energy from the combustion zone into an output fiber.

20 Claims, 5 Drawing Sheets

(58) Field of Classification Search
CPC ... G01N 2021/0314; G01N 2021/3155; G01N 2021/3513; G01N 2021/399; G01N 2201/0633; G01J 3/021; G01J 3/42
See application file for complete search history.

(56) References Cited

U.S. PATENT DOCUMENTS

| | | |
|---|---|---|
| 2005/0162655 A1 | 7/2005 | Nadler |
| 2006/0102844 A1* | 5/2006 | Sauer ................ G01N 21/3504 250/339.13 |
| 2007/0242275 A1* | 10/2007 | Spartz ................ G01N 21/031 356/451 |
| 2018/0172580 A1 | 6/2018 | Bjorøy |
| 2019/0301737 A1 | 10/2019 | Masterson et al. |

FOREIGN PATENT DOCUMENTS

| | | |
|---|---|---|
| WO | 2007087081 A2 | 8/2007 |
| WO | 2008065336 A1 | 6/2008 |

OTHER PUBLICATIONS

International Search Report and Written Opinion received for PCT Application No. PCT/IB2021/058469, mailed on Nov. 26, 2021, 15 pages.

Masiyano, D., et al., "Use of diffuse reflections in tunable diode laser absorption spectroscopy: implications of laser speckle for gas absorption measurements", Applied Physics B: Lasers and Optics, Vo. 90, 2008, pp. 279-288.

Palmer, J., et al., "Propagation of Optical Radiation", Chapter. 2, the Art of Radiometry, 2009, pp. 11-59.

Severin, P.J., et al., "A Simple Multimode Fiber Interferometric Sensor For Pressure-Related Measurements", Philips Journal of Research, vol. 43, No. 2, 1998, pp. 137-151.

* cited by examiner

COMBUSTION-ZONE CHEMICAL SENSING SYSTEM AND ASSOCIATED METHOD

RELATED APPLICATIONS

This application is a national phase of PCT/IB2021/058469, filed on Sep. 16, 2021, which claims priority U.S. Provisional Patent Application No. 63/089,555, filed Oct. 9, 2020, which is are incorporated herein by reference in their entireties.

BACKGROUND

Tunable diode laser absorption spectroscopy (TDLAS) has been used to monitor combustion including combustion in large-scale furnaces. TDLAS systems monitor the presence or concentration of gases within combustion process chambers and in combustion zones. These systems use near infrared (NIR) and visible light with fiber optic cables to direct electromagnetic energy from a laser on one side of the combustion zone where the light may be absorbed by chemical species in the chamber; remaining light is focused into another fiber optic cable on the other side of the combustion zone and directed to a detector where the signal is detected and analyzed so that a concentration of one or more species can be calculated.

Conventional TDLAS systems thus utilize separate pitch and a catch heads, both connected by fiber optics cables to the laser and the detector, respectively. This allows for maintaining sufficient distances between the electronics, lasers, and detectors of the TDLAS system and the high-temperature combustion process chamber. The pitch head and catch head are located at two locations around the combustion process chamber and may be positioned directly across the chamber to maximize interactions of light with combustion species to thereby increase the signal-to-noise ratio.

SUMMARY OF THE INVENTION

In an embodiment, a combustion-zone chemical sensing system includes pitch reflective optics on a first side of the combustion zone that collimate MIR electromagnetic energy from an input fiber; a reflector on a second side of the combustion zone that reflects collimated MIR electromagnetic energy; catch reflective optics on the first side of the combustion zone that focus reflected MIR electromagnetic energy into an output fiber; and a detector to detect MIR electromagnetic energy from the output fiber.

In an embodiment, an optical head for sensing a combustion zone includes pitch reflective optics that collimate MIR electromagnetic energy from an input fiber towards a reflector; catch reflective optics that focus MIR electromagnetic energy into an output fiber, reflected from the reflector; and an alignment housing that interfaces with structure adjacent the combustion zone and that holds and positions the pitch reflective optics and catch reflective optics with respect to the combustion zone.

In an embodiment, a method for determining gas concentration within a combustion zone includes collimating MIR electromagnetic energy exiting from an input fiber to traverse a combustion zone; and focusing reflected MIR electromagnetic energy from the combustion zone to an output fiber.

DETAILED DESCRIPTION OF THE EMBODIMENTS

Figure 1:
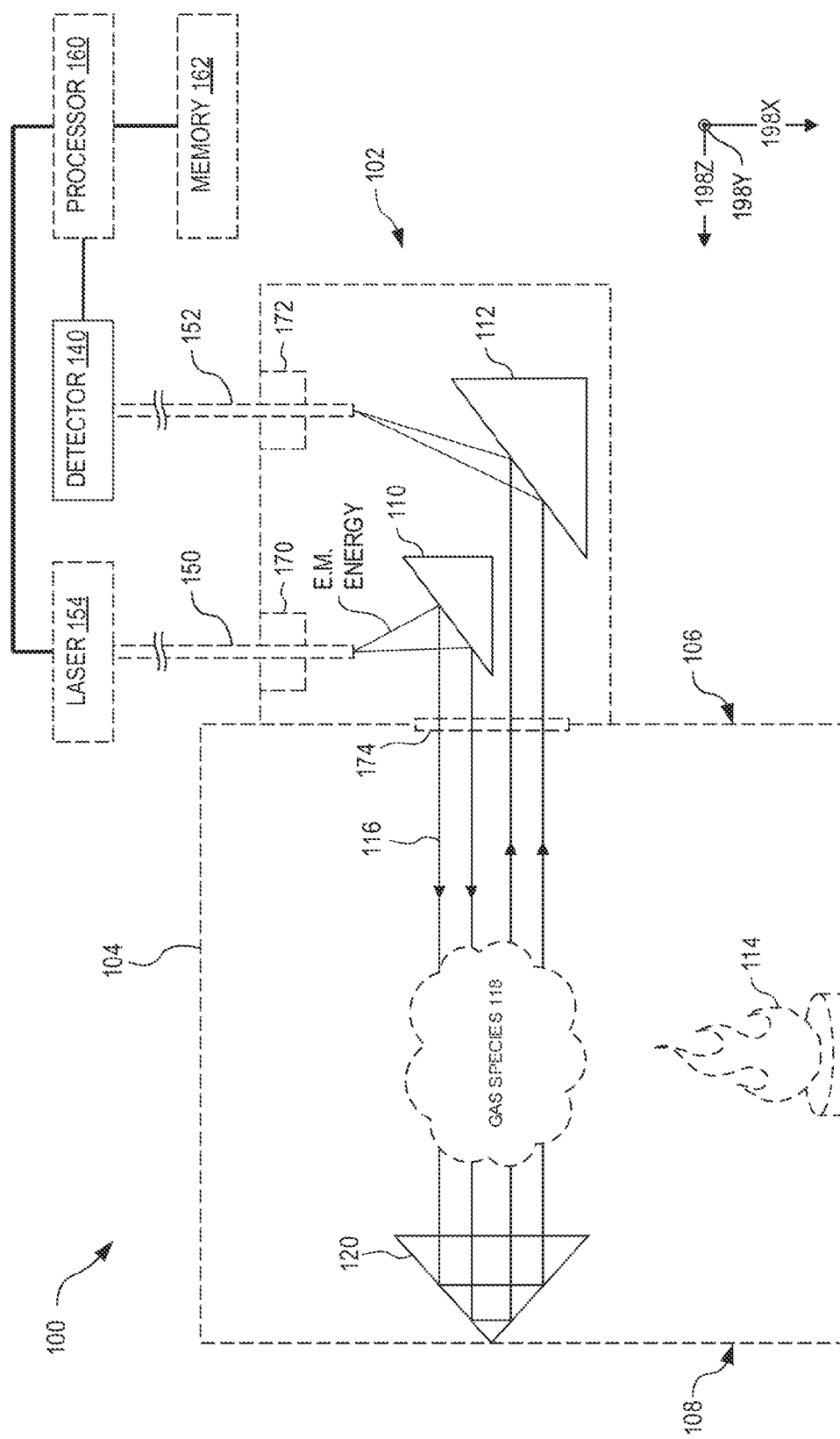
FIG. 1 illustrates a combustion-zone chemical sensing system, according to an embodiment.

Using optical techniques to monitor efficiency inside combustion process chambers is advantageous because, among other reasons, invasive monitoring probes may affect the processes being monitored. Tunable diode laser absorption spectroscopy (TDLAS) has been used to monitor a range of combustion processes using a variety of absorption features of gases that are found in combustion environments. Water vapor, carbon dioxide and carbon monoxide are frequent targets due to their relatively strong absorption features, each having known absorption features in the near infrared (NIR) and visible region of the electromagnetic spectrum. In some situations, it would be desirable to expand the bandwidth of light used in TDLAS systems since some molecules have strong absorption features in the longer-wavelength portion of the infrared, specifically within the mid infrared (MIR). Carbon monoxide, for example, has an absorption feature near $\lambda=2302$ nanometers (nm) that exhibits much stronger absorption than any CO absorption features in the NIR and visible.

Operating TDLAS systems in the infrared is challenging in practice, however, because the materials used in conventional fiber optics often exhibit attenuated transmission at longer wavelengths, which limits the available signal-to-noise ratio of infrared measurements. For this reason, conventional TDLAS uses a CO absorption feature at $\lambda=1560$ nm, which limits the detection limit of CO due to the weaker absorption cross section.

Another challenge in operating TDLAS systems with MIR electromagnetic energy is that lenses used to focus light into and out of the fiber optic cables display chromatic aberration for longer wavelengths. Conventional lenses use the index of refraction of the lens material to refract light at the lens's surface and redirect it; however, the index of refraction changes with changing wavelength and so it is difficult to design lens-based optical systems that focus not only NIR and visible electromagnetic energy but also MIR electromagnetic energy.

The present embodiments ameliorate the above-mentioned challenges and allow the use of TDLAS system at visible, NIR, and MIR wavelengths, thereby increasing the detection sensitivity and system functionality.

In order to maintain sufficient light intensity to perform measurements using MIR electromagnetic energy, the present embodiments describe a TDLAS system with a single optical head (FIGS. 1, 2, 3, 4) mounted to the combustion process chamber. By removing the need for a second optical head, the length of required fiber optic cable is dramatically reduced while sufficient distances are maintained between the combustion process chamber and electrical systems required to run TDLAS. In conventional two-optical-head setups, additional fiber optic cable is required to connect both the pitch head and the catch head to the electrical components of the system. For a large process chamber, e.g., one with a diameter equal to fifteen meters, the fiber optic cable must travel halfway around the perimeter of the chamber to connect the other optical head to the laser, detector, and associated electronics, adding roughly twenty meters of additional fiber optic cable to the system. Given the low transmissivity of MIR light within the fiber optic cable, there is not sufficient light intensity to perform MIR measurements with the two-head prior art solution.

In combination with the optical head described herein, a reflector is mounted inside the combustion process chamber to redirect electromagnetic energy from the optical head back across the combustion process chamber to the single optical head. In an embodiment, a retroreflector (e.g. a corner-cube mirror) is used as the reflector to direct the incoming light directly back toward the optical head for input to the output fiber optic, where it may be analyzed by associated detector and analysis electronics.

To accommodate a broad bandwidth of light, the combustion-zone chemical sensing system described herein utilizes mirrors that exhibit negligible wavelength dependence over the range of frequencies used. In an embodiment, therefore, an off-axis parabolic mirror is used to collimate light exiting the input fiber optic cable of the optical head; and a second off-axis parabolic minor at the same optical head is used to focus light into the output fiber optic cable.

FIG. 1 illustrates a combustion-zone chemical sensing system 100 with pitch reflective optics 110, a reflector 120, catch reflective optics 112 and a detector 140. Pitch reflective optics 110 and catch reflective optics 112 are on a first side 106 of a combustion zone 104 and the reflector 120 is on a second side 108 of the combustion zone 104. The pitch reflective optics 110 collimate MIR electromagnetic energy from an input fiber 150 to form the collimated electromagnetic energy 116 that traverses the combustion zone 104. The electromagnetic energy is reflected by the reflector 120, which may be positioned directly across the combustion zone 104 as shown. The reflector 120 may be located at other positions around the combustion zone 104 without departing from the scope herein. The catch reflective optics 112 focus reflected MIR electromagnetic energy into an output fiber 152 where it is conveyed to the detector 140. In an embodiment, the pitch reflective optics 110 and catch reflective optics 112 both mount to an optical head 102 that holds and positions the pitch reflective optics 110 and catch reflective optics 112 with respect to the combustion zone 104. In an embodiment, collimated electromagnetic energy 116 interacts with a gas species 118 generated by a combustion source 114 that is located in the combustion zone 104 and some of collimated electromagnetic energy 116 is absorbed, leading to a reduction in the power measured by detector 140. This absorption may be used to calculate a concentration of the gas species 118 present within the combustion zone 104. FIG. 1 includes axis indicators 198X, 198Y, and 198Z, which indicate the cartesian-coordinate system with X-axis, Y-axis and Z-axis associated with the combustion-zone chemical sensing system 100 illustrated in FIG. 1.

In an embodiment, the pitch reflective optics 110 further collimate near infrared (NIR) and visible electromagnetic energy in addition to MIR electromagnetic energy. As in the MIR, NIR and visible electromagnetic energy is reflected by reflector 120 and then focused by catch reflective optics 112 into the output fiber 152 and subsequently detected by detector 140. In this embodiment, the combustion-zone chemical sensing system 100 may be used with MIR, NIR, and visible light, thereby expanding the range of molecules that may be detected and increasing sensitivity of detection. For example, the combustion-zone chemical sensing system 100 may be operated using electromagnetic energy with $\lambda=2302$ nm, strongly absorbed by CO, and with electromagnetic energy of $\lambda=760$ nm, strongly absorbed by $O_2$.

In an embodiment, the input fiber 150 and the output fiber 152 have a combined length of less than twenty-eight meters. Electromagnetic energy with longer wavelengths, e.g., $\lambda=2302$ nm, is absorbed more than shorter wavelength light, e.g., $\lambda=760$ nm. Reducing the total length of fiber optic cable used in the combustion-zone chemical sensing system 100 increases the total amount of MIR electromagnetic energy that reaches the combustion zone 104 and the detector 140, thereby increasing sensitivity of the combustion-zone chemical sensing system 100.

In an embodiment, the reflector 120 is a retroreflector, which reflects collimated electromagnetic energy 116 back towards the first side 106 of the combustion zone 104 and back to the optical head 102. Using a retroreflector reduces the alignment requirements necessary for the combustion-zone chemical sensing system 100, which beneficially decreases installation complexity as well as potential maintenance/reinstallation costs and potential sources of failure during operation.

In an embodiment, the pitch reflective optics 110 has only a single reflective mirror that collimates a broadband range of electromagnetic energy including MIR, NIR, and visible. In an embodiment, the pitch reflective optics 110 is an off-axis parabolic mirror with a focus aligned with the exit of the input fiber 150. The combustion-zone chemical sensing system 100 may include an input fiber mount 170 to position the exit of the input fiber 150 with respect to the pitch reflective optics 110.

In an embodiment, the catch reflective optics 112 has only a single reflective mirror that collects and focuses a broadband range of electromagnetic energy including MIR, NIR, and visible. In an embodiment, the catch reflective optics 112 is an off-axis parabolic mirror with a focus that is aligned with the entrance of the output fiber 152. The combustion-zone chemical sensing system 100 may include an output fiber mount 172 to position the entrance of the output fiber 152 with respect to the catch reflective optics 112. One or both of the pitch reflective optics 110 and catch reflective optics 112 may each have more than one optical element without departing from the scope hereof.

In an embodiment, the input fiber 150 is a single-mode optical fiber and the output fiber 152 is a multi-mode optical fiber, though input fiber 150 may be a multi-mode fiber and output fiber 152 may be a single-mode fiber without departing from the scope hereof.

In an embodiment, the combustion-zone chemical sensing system 100 includes a laser 154 that generates MIR electromagnetic energy directed into the input fiber 150 and which propagates through the combustion zone 104 as collimated electromagnetic energy 116. The system may further include a processor 160 that communicatively couples to the detector 140 and the laser 154. The processor 160 is communicatively coupled to a memory 162 that stores machine readable instructions which, when executed by the processor 160, determine a concentration of a gas species 118 within the combustion zone 104 based at least on a power measured by the detector 140.

The laser 154, or multiple lasers 154, may generate electromagnetic energy at more than one wavelength, each wavelength associated with a known absorption features of a target gas species, making the combustion-zone chemical sensing system 100 capable of calculating a concentration of more than one gas species 118 present in the combustion zone 104. For example, the laser 154 may generate electromagnetic energy with λ=2302 nm, which is strongly absorbed by CO, and generate electromagnetic energy with λ=760 nm, which is strongly absorbed by $O_2$. The processor 160 may thereby calculate a concentration of both CO and $O_2$ based upon the power measured by the detector 140 for electromagnetic energy generated at each wavelength. The combustion-zone chemical sensing system 100 may operate using electromagnetic energy with other wavelengths and may calculate a concentration of other chemical species in addition to or in place of CO and $O_2$ without departing from the scope herein.

The combustion-zone chemical sensing system 100 may include a window 174 that separates the combustion zone 104 from the optical head 102. The window 174 may be formed of a material that is transmissive to a range of electromagnetic energy including one or more of MIR, NIR, and visible.

Figure 2:
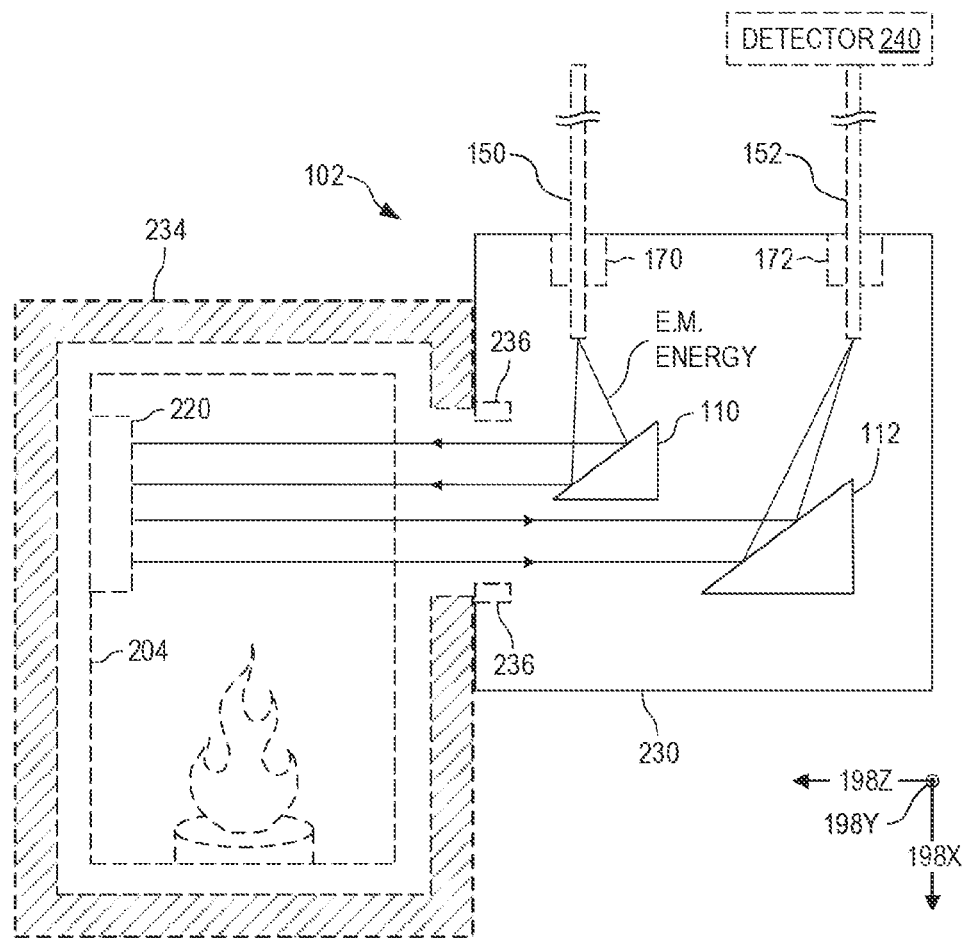
FIG. 2 illustrates an optical head for sensing that may be used with the combustion-zone chemical sensing system of FIG. 1, according to an embodiment

FIG. 2 illustrates the optical head 102 of FIG. 1 shown sensing a combustion zone 204. Optical head 102 includes pitch reflective optics 110, catch reflective optics 112, and an alignment housing 230. The pitch reflective optics 110 collimates MIR electromagnetic energy from input fiber 150 toward a reflector 220. The catch reflective optics 112 focus MIR electromagnetic energy reflected from the reflector 220 into the output fiber 152. The alignment housing 230 interfaces with a structure 234 adjacent the combustion zone 204. The structure 234 may be a combustion process chamber, furnace, or other structure associated with a combustion process and may not surround the combustion zone 204 as is shown in FIG. 2. The alignment housing 230 holds and positions the pitch reflective optics 110 and catch reflective optics 112 with respect to the combustion zone 204. FIG. 2 illustrates a sideview of optical head 102 along with axis indicators 198X, 198Y, and 198Z, which indicate the cartesian-coordinate system with X-axis, Y-axis and Z-axis. The electromagnetic energy collimated by pitch reflective optics 110 propagates parallel to the Z-axis.

In an embodiment, the alignment housing 230 forms a mechanical aperture 236 through which (a) the pitch reflective optics 110 collimate MIR electromagnetic energy into the combustion zone 204 and (b) the catch reflective optics 112 captures MIR electromagnetic energy from the combustion zone 204.

In an embodiment, the optical head 102 includes the input fiber mount 170 that positions the input fiber 150 with respect to pitch reflective optics 110 and the output fiber mount 172 that positions the output fiber 152 with respect to the catch reflective optics 112. Both the input fiber mount 170 and output fiber mount 172 are affixed to the alignment housing 230. In an embodiment, the output fiber 152 is connected to the detector 140 that detects MIR electromagnetic energy from the output fiber 152.

In an embodiment, the pitch reflective optics 110 collimate NIR and visible electromagnetic energy in addition to MIR electromagnetic energy. Use of MIR, NIR, and visible electromagnetic energy with optical head 102 allows for detection of gas species present in a combustion zone 204 that absorb electromagnetic energy at a wide range of wavelengths, e.g., gas species 118 in combustion zone 104. In an embodiment, the MIR electromagnetic energy used by optical head 102 has a wavelength between 2250 and 2350 nm, which is useful in monitoring CO gas that absorbs electromagnetic energy strongly at 2302 nm.

In an embodiment, the alignment housing positions the pitch reflective optics 110 and the catch reflective optics 112 such that the MIR electromagnetic energy reflected by the pitch reflective optics 110 is antiparallel to MIR electromagnetic energy immediately before being focused by the catch reflective optics 112. This is beneficial since it decreases the installation complexity of the optical head 102 and reduces potential maintenance/reinstallation costs and reduces potential sources of failure during operation.

The combustion zone 204 and reflector 220, are examples of combustion zone 104 and reflector 120 of FIG. 1, respectively, and the descriptions of each respective element apply between the two figures.

Figure 3:
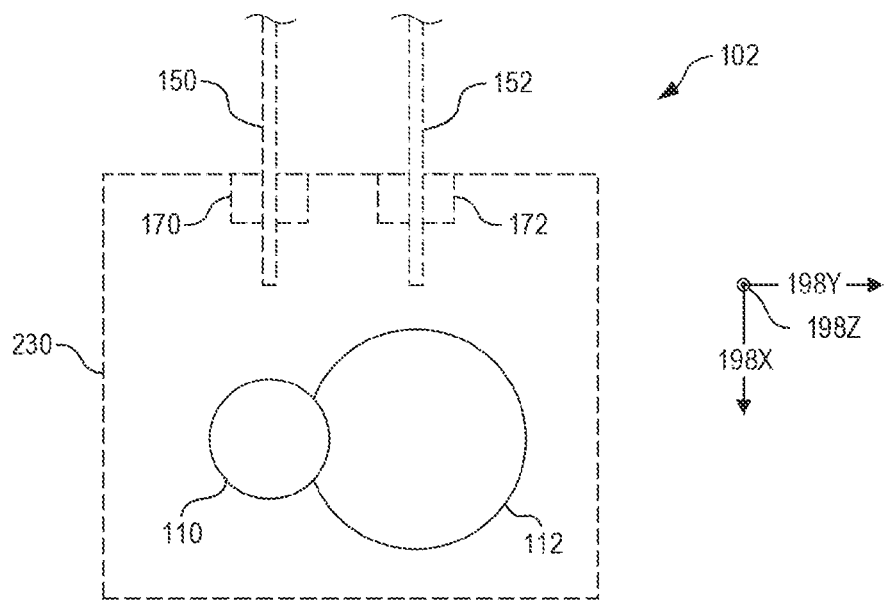
FIG. 3 illustrates the optical head of FIG. 2 viewed along an orthogonal axis, according to an embodiment.

FIG. 3 illustrates the optical head 102 viewed along Z-axis, shown as 198Z, which in an embodiment is parallel to electromagnetic energy collimated by pitch reflective optics 110. Optical head 102 is compatible with use in combustion-zone chemical sensing system 100. Optical head 102 includes catch reflective optics 112 as well as input fiber 150, input fiber mount 170, output fiber 152 and output fiber mount 172. Pitch reflective optics 110, input fiber mount 170, catch reflective optics 112, and output fiber mount 172 are attached to the alignment housing 230.

As shown in FIG. 3, the pitch reflective optics 110 and catch reflective optics 112 may be overlapped when viewed from along the Z-axis and the catch reflective optics 112 are larger than the pitch reflective optics 110. In practice, the electromagnetic energy collimated by the pitch reflective optics 110 may be slightly divergent (not fully collimated) and once electromagnetic energy is reflected to the catch reflective optics 112 it has expanded. As a result, larger optics are appropriate in order to collect more light. The relative size and position of the pitch reflective optics 110 and catch reflective optics 112 may be varied without departing from the scope herein.

Figure 4A:
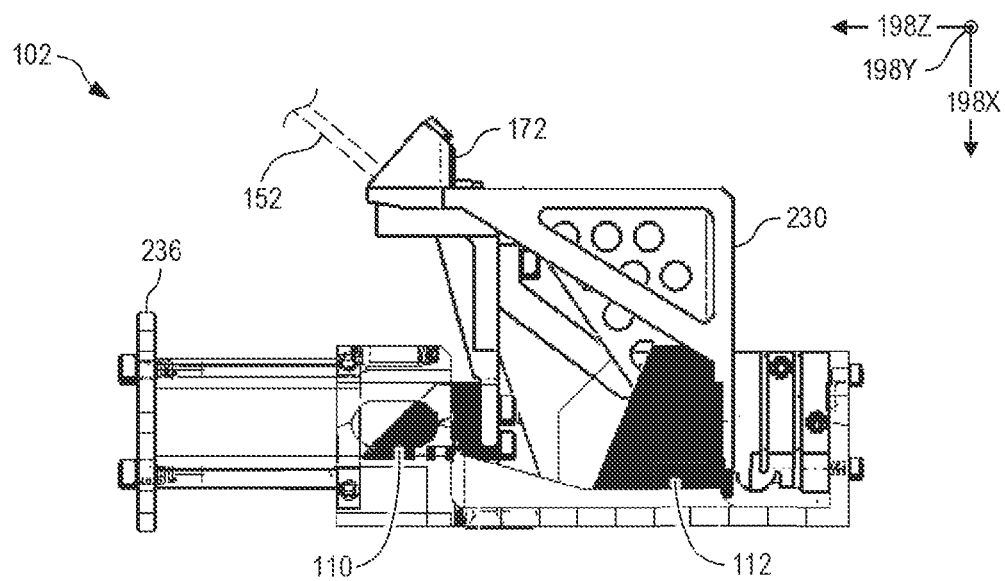
FIGS. 4A and 4B show one embodiment of the optical head shown in FIGS. 2 and 3 viewed along two perpendicular side views.
Figure 4B:
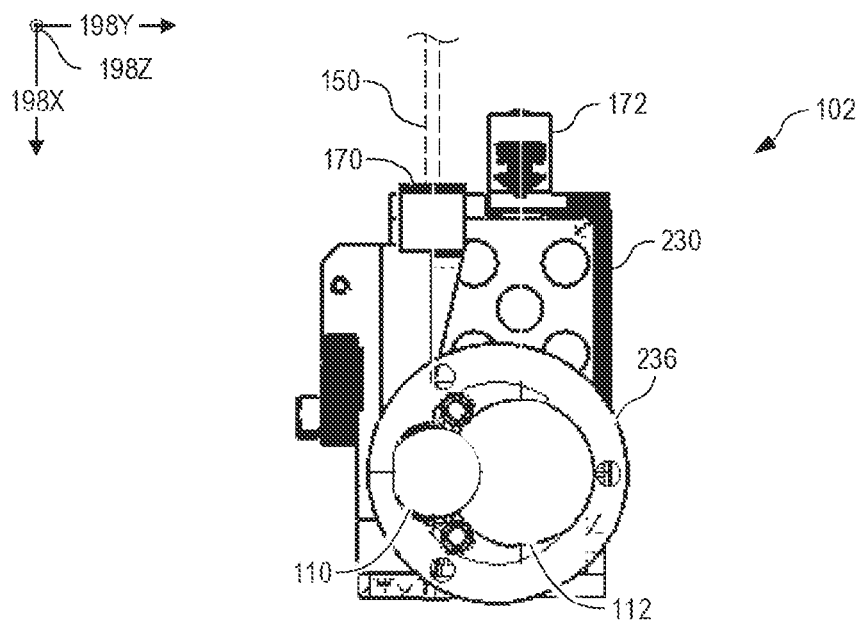

FIGS. 4A and 4B shows a mechanical implementation of the optical head 102, in an embodiment, and are best viewed together. FIG. 4A illustrates the optical head 102 viewed along the Y-axis and shows pitch reflective optics 110, catch reflective optics 112, output fiber mount 172, and mechanical aperture 236 all mounted to alignment housing 230. Output fiber mount 172 positions the output fiber 152 with respect to catch reflective optics 112. Electromagnetic energy collimated by pitch reflective optics 110 and electromagnetic energy reflected toward catch reflective optics 112 travel through the mechanical aperture 236, shown edge-on in FIG. 4A. For clarity of illustration, input fiber 150 is not shown and input fiber mount 170 is not indicated in FIG. 4A.

FIG. 4B illustrates the optical head 102 viewed along the Z-axis and shows pitch reflective optics 110, catch reflective optics 112, input fiber mount 170, and mechanical aperture 236 all mounted to alignment housing 230. Input fiber mount 170 positions the input fiber 150 with respect to pitch reflective optics 110. Electromagnetic energy collimated by pitch reflective optics 110 and electromagnetic energy reflected toward catch reflective optics 112 travel through the mechanical aperture 236, shown face-on in FIG. 4B. For clarity of illustration, output fiber 152 is not shown in FIG. 4B.

Figure 5:
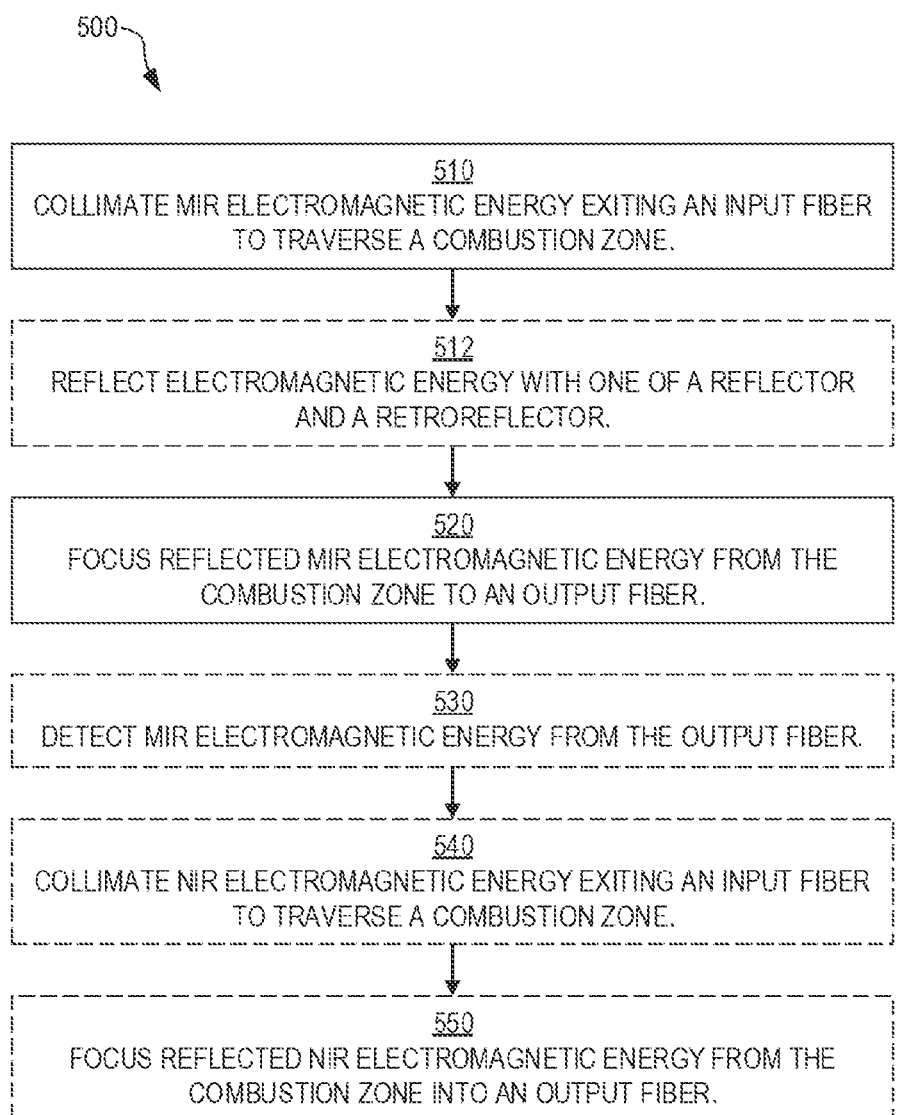
FIG. 5 is a flowchart illustrating a method for determining gas concentration within a combustion zone and suitable for use with the system of FIG. 1, according to an embodiment.

FIG. 5 is a flowchart illustrating a method 500 for determining gas concentration within a combustion zone. Method 500 may be used with combustion-zone chemical sensing system 100 and alternatively may employ optical head 102. Method 500 includes blocks 510 and 520. In embodiments, the method 500 also includes one or more of 512, 530, 540, and 550.

In block 510 of method 500, MIR electromagnetic energy exiting an input fiber is collimated and directed to traverse a combustion zone. In one example of block 510, MIR electromagnetic energy is collimated by the pitch reflective optics 110 after exiting the input fiber 150 and then traverses the combustion zone 104.

In block 520 of the method 500, reflected MIR electromagnetic energy from the combustion zone is focused into an output fiber. In one example of block 520, MIR electromagnetic energy from the combustion zone 104 is focused by the catch reflective optics 112 into the output fiber 152.

In certain embodiments, the method 500 includes one or more additional blocks of the flowchart in FIG. 5. In block 512, electromagnetic energy is reflected with one of a reflector and a retroreflector. In one example of block 512, electromagnetic energy is reflected by the reflector 120 in the form of a retroreflector.

In block 530 of the method 500, MIR electromagnetic energy from the output fiber is detected with a detector. In one example of block 530, MIR electromagnetic energy exiting the output fiber 152 is detected by the detector 140.

In block 540 of the method 500, NIR and visible electromagnetic energy exiting an input fiber are collimated and directed to traverse a combustion zone. In one example of block 540, NIR and visible electromagnetic energy are collimated by the pitch reflective optics 110 after exiting the input fiber 150 and then traverses the combustion zone 104.

In block 550 of the method 500, reflected NIR and visible electromagnetic energy from the combustion zone are focused into an output fiber. In one example of block 550, NIR and visible electromagnetic energy from the combustion zone 104 is focused by the catch reflective optics 112 into the output fiber 152.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features (A1) in a first aspect, a combustion-zone chemical sensing system includes pitch reflective optics on a first side of the combustion zone that collimate MIR electromagnetic energy from an input fiber; a reflector on a second side of the combustion zone that reflects collimated MIR electromagnetic energy; catch reflective optics on the first side of the combustion zone that focus reflected MIR electromagnetic energy into an output fiber; and a detector to detect MIR electromagnetic energy from the output fiber.

(A2) In an embodiment of A1, the pitch reflective optics further collimating NIR and visible electromagnetic energy.

(A3) In an embodiment of either A1 or A2, further including an input fiber and an output fiber, a combined length of the input fiber and the output fiber being less than 28 meters.

(A4) In an embodiment of A3, the output fiber being a multi-mode optical fiber.

(A5) In an embodiment of any of A1 through A4, the reflector being a retroreflector.

(A6) In an embodiment of any of A1 through A5, the pitch reflective optics include an off-axis parabolic minor and the catch reflective optics include an off-axis parabolic mirror.

(A7) In an embodiment of any of A1 through A6, further including a laser that generates MIR electromagnetic energy conveyed into an input fiber, a processor communicatively coupled to the detector; and memory communicatively coupled to the processor and storing machine readable instructions that, when executed by the processor, calculate a concentration of a gas species within the combustion zone based at least on a power measured by the detector.

(B1) In a second aspect, an optical head for sensing a combustion zone includes pitch reflective optics that collimate MIR electromagnetic energy from an input fiber towards a reflector; catch reflective optics that focus MIR electromagnetic energy into an output fiber, reflected from the reflector; and an alignment housing that interfaces with structure adjacent the combustion zone and that holds and positions the pitch reflective optics and catch reflective optics with respect to the combustion zone.

(B2) In an embodiment of B1, the alignment housing forming a mechanical aperture through which a) the pitch reflective optics collimate MIR electromagnetic energy into the combustion zone and (b) the catch reflective optics captures MIR electromagnetic energy from the combustion zone.

(B3) In an embodiment of either B1 or B2, further including an input fiber mount that positions the input fiber with respect to the pitch reflective optics; and an output fiber mount that positions the output fiber with respect the catch reflective optics (B4) In an embodiment of any of B1 through B3, the alignment housing positioning the pitch reflective optics and catch reflective optics such that MIR electromagnetic energy reflected by the pitch reflective optics is antiparallel to MIR electromagnetic energy before it is focused by the catch reflective optics.

(B5) In an embodiment of any of B1 through B4, the MIR electromagnetic energy having a wavelength between 2250 and 2350 nanometers.

(B6) In an embodiment of any of B1 through B5, the output fiber being connected to a detector that detects MIR electromagnetic energy from the output fiber.

(B7) In an embodiment of any of B1 through B6, the pitch reflective optics further collimating NIR and visible electromagnetic energy.

(B8) In an embodiment of any of B1 through B7, wherein the pitch reflective optics include an off-axis parabolic mirror and wherein the catch reflective optics include an off-axis parabolic minor.

(C1) In a third aspect, a method for determining gas concentration within a combustion zone includes collimating MIR electromagnetic energy exiting from an input fiber to traverse a combustion zone; and focusing reflected MIR electromagnetic energy from the combustion zone to an output fiber.

(C2) In an embodiment of C1, further including detecting MIR electromagnetic energy from the output fiber.

(C3) In an embodiment of either C1 or C2, further including collimating NIR and visible electromagnetic energy exiting from the input fiber to traverse the combustion zone; and focusing NIR and visible reflected electromagnetic energy from the combustion zone into the output fiber.

(C4) In an embodiment of any of C1 through C3, further including reflecting electromagnetic energy with one of a reflector and a retroreflector.

(C5) In an embodiment of any C1 through C4, the step of collimating includes reflecting electromagnetic energy with an off-axis parabolic reflector; and the step of focusing includes focusing electromagnetic energy with an off-axis parabolic reflector.

What is claimed is:

1. A combustion-zone chemical sensing system, comprising:
   pitch reflective optics positioned in a pitch head on a first side of the combustion zone that collimate mid-infrared (MIR) electromagnetic energy from an input fiber;
   a reflector on a second side of the combustion zone that reflects collimated MIR electromagnetic energy;
   catch reflective optics in the pitch head on the first side of the combustion zone that focus reflected MIR electromagnetic energy into an output fiber; and
   a detector to detect MIR electromagnetic energy from the output fiber.

2. The combustion-zone chemical sensing system of claim 1, the pitch reflective optics further collimating NIR and visible electromagnetic energy.

3. The combustion-zone chemical sensing system of claim 1, wherein the pitch head is a single pitch head, and the system further comprises an input fiber and an output fiber coupled to the single pitch head, a combined length of the input fiber and the output fiber being less than 28 meters.

4. The combustion-zone chemical sensing system of claim 3, the input fiber being a single-mode optical fiber and the output fiber being a multimode optical fiber.

5. The combustion-zone chemical sensing system of claim 1, the reflector being a retroreflector.

6. The combustion-zone chemical sensing system of claim 1, wherein the pitch reflective optics comprise an off-axis parabolic mirror and the catch reflective optics comprise an off-axis parabolic mirror.

7. The combustion-zone chemical sensing system of claim 1, further comprising:
   a laser that generates MIR electromagnetic energy conveyed into an input fiber, a processor communicatively coupled to the detector; and
   memory communicatively coupled to the processor and storing machine readable instructions that, when executed by the processor, calculate a concentration of a gas species within the combustion zone based at least on a power measured by the detector.

8. An optical head for sensing a combustion zone, comprising:
   pitch reflective optics that collimate MIR electromagnetic energy from an input fiber towards a reflector, the pitch reflective optics positioned in the optical head on a first side of the combustion zone;
   catch reflective optics that focus MIR electromagnetic energy into an output fiber, reflected from the reflector, the catch reflective optics positioned in the optical head on the first side of the combustion zone; and
   an alignment housing that interfaces with structure adjacent the combustion zone and that is configured to hold and position the pitch reflective optics and catch reflective optics with respect to the combustion zone.

9. The optical head of claim 8, the alignment housing forming a mechanical aperture through which a) the pitch reflective optics collimate MIR electromagnetic energy into the combustion zone and (b) the catch reflective optics captures MIR electromagnetic energy from the combustion zone.

10. The optical head of claim 8, the alignment housing further comprising:
    an input fiber mount that positions the input fiber with respect to the pitch reflective optics; and
    an output fiber mount that positions the output fiber with respect the catch reflective optics.

11. The optical head of claim 8, the alignment housing positioning the pitch reflective optics and catch reflective optics such that MIR electromagnetic energy reflected by the pitch reflective optics is antiparallel to MIR electromagnetic energy before it is focused by the catch reflective optics.

12. The optical head of claim 8, the MIR electromagnetic energy having a wavelength between 2250 and 2350 nanometers.

13. The optical head of claim 8, the output fiber being connected to a detector that detects MIR electromagnetic energy from the output fiber.

14. The optical head of claim 8, the pitch reflective optics further collimating NIR and visible electromagnetic energy.

15. The optical head of claim 8, wherein the pitch reflective optics comprise an off-axis parabolic mirror and wherein the catch reflective optics comprise an off-axis parabolic mirror.

16. A method for determining gas concentration within a combustion zone, comprising:
    providing an alignment housing comprising pitch reflective optics and catch reflective optics;
    interfacing the alignment housing with structure adjacent the combustion zone;
    collimating mid-infrared (MIR) electromagnetic energy exiting from an input fiber to traverse the combustion zone via the pitch reflective optics;
    focusing MIR electromagnetic energy reflected from the combustion zone to an output fiber via the catch reflective optics; and
    holding and positioning the pitch reflective optics and catch reflective optics at a first side of the combustion zone.

17. The method of claim 16, further comprising detecting MIR electromagnetic energy from the output fiber.

18. The method of claim 16, further comprising:
    collimating NIR and visible electromagnetic energy exiting from the input fiber to traverse the combustion zone; and
    focusing NIR and visible reflected electromagnetic energy from the combustion zone into the output fiber.

19. The method of claim 16, further comprising reflecting electromagnetic energy with one of a reflector and a retroreflector.

20. The method of claim 16, further wherein:
    the step of collimating comprises reflecting electromagnetic energy with an off-axis parabolic reflector; and
    the step of focusing comprising focusing electromagnetic energy with an off-axis parabolic reflector.

* * * * *